United States Patent
Ening

(10) Patent No.: US 7,375,626 B2
(45) Date of Patent: May 20, 2008

(54) ARRANGEMENT OF A MAGNETIC COUPLING COIL AND A TRANSPONDER CIRCUIT ON A VEHICLE WHEEL

(75) Inventor: Christian Ening, Köln (DE)

(73) Assignee: Sokymat Automotive GmbH, Reichshof-Wehnrath (DE)

(*) Notice: Subject to any disclaimer, the term of this patent is extended or adjusted under 35 U.S.C. 154(b) by 240 days.

(21) Appl. No.: 11/214,884

(22) Filed: Aug. 31, 2005

(65) Prior Publication Data

US 2006/0049928 A1    Mar. 9, 2006

(30) Foreign Application Priority Data

Sep. 3, 2004    (EP)    ................... 04020958

(51) Int. Cl.
*B60C 23/00*    (2006.01)
(52) U.S. Cl. .............. 340/447; 340/572.7; 343/866
(58) Field of Classification Search .............. 340/442, 340/445–448, 572.7; 343/866
See application file for complete search history.

(56) References Cited

U.S. PATENT DOCUMENTS 6,885,291 B1 * 4/2005 Pollack et al. ............. 340/445
7,102,519 B2 * 9/2006 Lyon et al. ............. 340/572.1

FOREIGN PATENT DOCUMENTS

| | | |
|---|---|---|
| DE | 199 24 830 A1 | 11/2000 |
| EP | 657 836 A1 | 6/1995 |
| EP | 1 354 729 A1 | 4/2003 |
| WO | WO 2004/025543 A1 | 3/2004 |

* cited by examiner

*Primary Examiner*—Benjamin C. Lee
*Assistant Examiner*—Shirley Lu
(74) *Attorney, Agent, or Firm*—Sughrue Mion, PLLC

(57) ABSTRACT

The arrangement of a magnetic coupling coil (2) and a transponder circuit (1) on a vehicle wheel (5) allows wireless data communication with an interrogation circuit (3) arranged on a fixed structure of the vehicle on which the wheel is mounted so as to be able to rotate about at least one rotational axis (9). The magnetic coupling coil is mounted coaxially to the rotational axis of the wheel and defines a closed loop. This coupling coil acts as an inductive coupling interface between an antenna coil (10) of the transponder and an excitation coil (4) of the interrogation circuit. This magnetic coupling coil comprises a loop portion (2") oriented such that the magnetic field (11') in the magnetic coupling coil, which is induced by a primary magnetic field (8) generated by the interrogation circuit excitation coil, is directed in this loop portion in a substantially perpendicular direction to the primary magnetic field. The antenna coil (10) of the transponder circuit, which is arranged in a winding (2") of the coupling coil loop portion, is oriented so that only the magnetic field induced in the coupling coil loop portion passes therethrough without being influenced by the primary magnetic field.

8 Claims, 3 Drawing Sheets

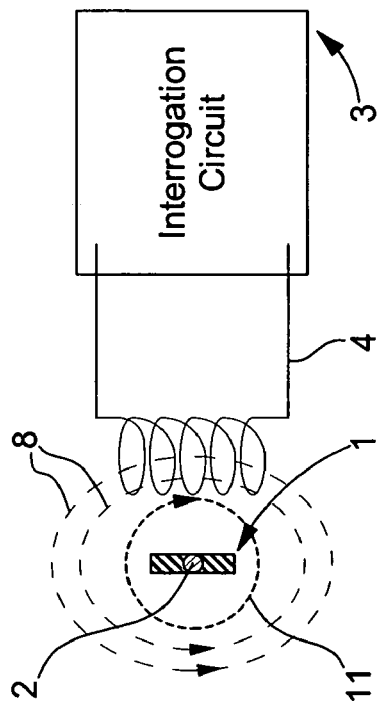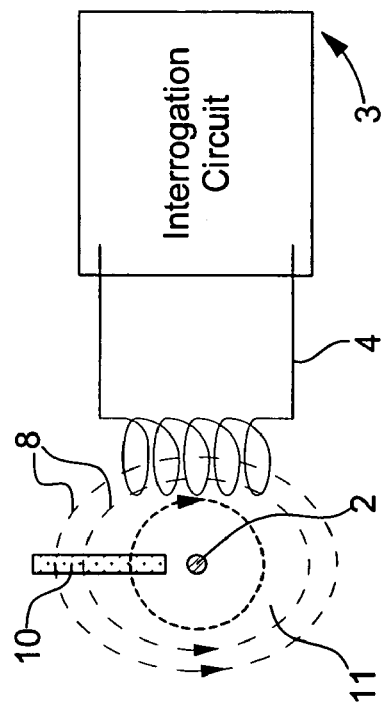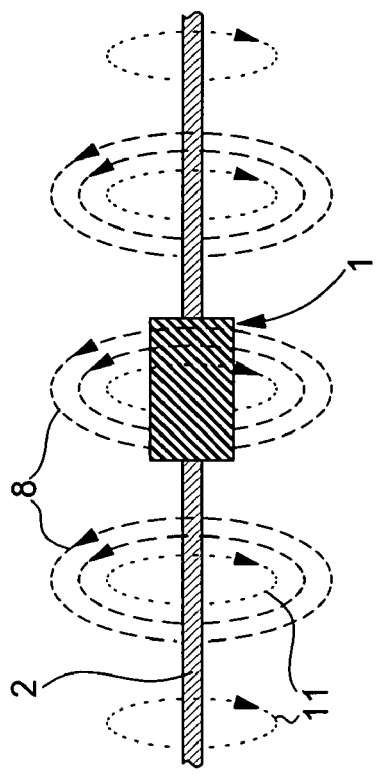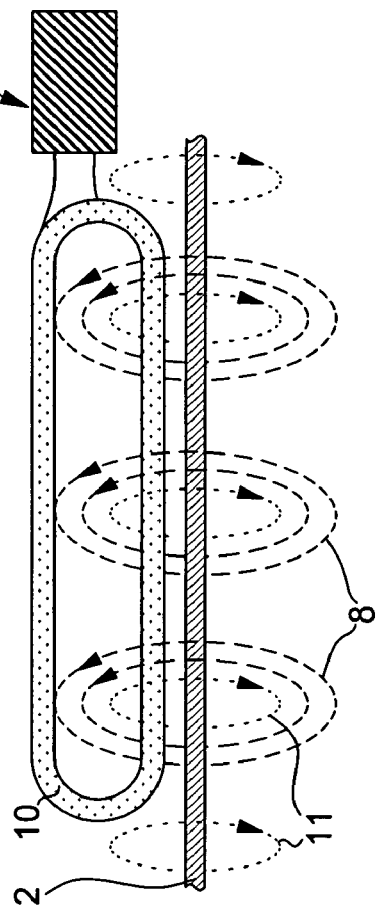

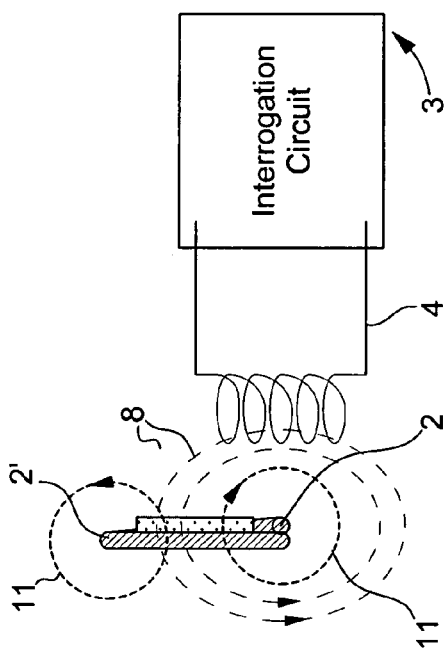
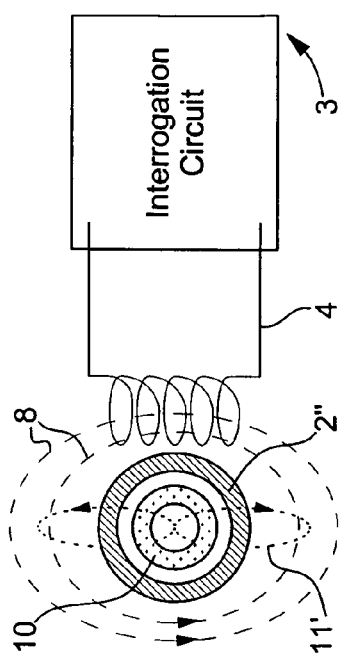
Fig. 4a (Prior Art)
Fig. 4b (Prior Art)
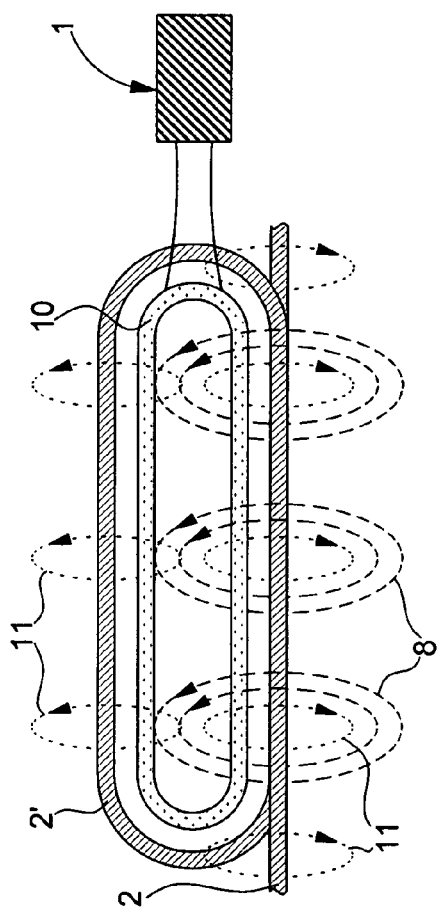
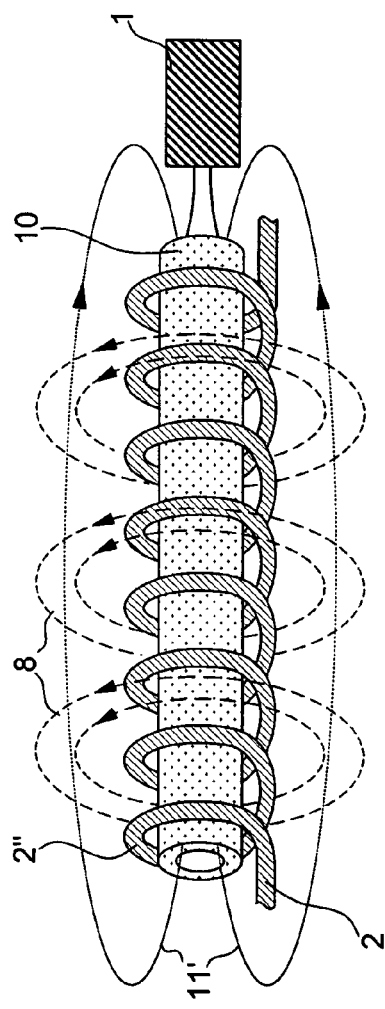
Fig. 5a
Fig. 5b

ARRANGEMENT OF A MAGNETIC COUPLING COIL AND A TRANSPONDER CIRCUIT ON A VEHICLE WHEEL

This application claims priority from European Patent Application No. 04020958.7 filed Sep. 3, 2004, the entire disclosure of which is incorporated herein by reference.

FIELD OF THE INVENTION

The invention concerns an arrangement of a magnetic coupling coil and a transponder circuit on a vehicle wheel so as to provide wireless data communication with an interrogation circuit arranged on a fixed structure of the vehicle. The wheel is mounted on this structure, such as the chassis or body, so as to be able to rotate at least about one rotational axis. The magnetic coupling coil, which is mounted coaxially to the rotational axis of the wheel and defines a closed loop, acts as an inductive coupling interface between an antenna coil of the transponder circuit and an excitation coil of the interrogation circuit.

BACKGROUND OF THE INVENTION

Wireless data communication using inductive signals between an antenna coil of a transponder circuit arranged on a vehicle wheel and an excitation coil of an interrogation circuit mounted on the vehicle body is well known. An arrangement of the transponder circuit with its antenna coil on the wheel can be chosen such that data communication is, if possible, independent of the position of the transponder on the tyre in relation to the interrogation circuit. Data communicated between the transponder circuit and the interrogation circuit can be identification data and/or data concerning measurements carried out by one or several of the transponder circuit sensors.

As can be seen with reference to FIGS. 1a and 1b, transponder circuit 1 is for example mounted on an inner wall of tyre 6 of vehicle wheel 5 with a magnetic coupling coil 2. An interrogation circuit 3 fixed onto a fixed structure of the vehicle communicates data to the transponder circuit via a primary magnetic field 8 generated by an excitation coil 4.

The magnetic coupling coil 2 is mounted coaxially to the rotational axis that passes through the centre of the wheel rim 7 such that data communication with interrogation circuit 3 is, if possible, independent of the position of the transponder circuit on the wheel. This coupling coil can define a closed loop in order to act as an inductive interface between excitation coil 4 of interrogation circuit 3 and an antenna coil of the transponder circuit, which is not shown in FIGS. 1a and 1b. The magnetic coupling coil can also be directly connected to the transponder to act as the transponder circuit antenna coil.

In the example shown in FIGS. 2a and 2b, transponder 1 is directly connected to magnetic coupling coil 2 which thus acts as the transponder circuit antenna coil. Coupling coil 2 is preferably arranged at the periphery of the vehicle tyre, as described generally in DE Patent No. 199 24 830, which shows this embodiment. The primary magnetic field 8 originating from excitation coil 4 of interrogation circuit 3 induces a current in the antenna coil. This induced current also induces a secondary magnetic field 11 in an opposite direction to the primary magnetic field.

Since transponder 1 is directly connected to the magnetic coupling coil as the transponder circuit antenna coil, it can be integrated in the tyre structure in an initial phase of the tyre manufacturing steps. However, it may undergo mechanical stresses, which are linked to the temperature increase, and to the bending or compression of certain parts of the tyre when the vehicle is moving, which is a drawback, since in the event of a failure, it is relatively difficult to change the transponder circuit.

Transponder 1 can also be connected to the magnetic coupling coil after the tyre manufacturing steps by using a specific connector. However, with a connector of this type, over time and with the various stresses to which the tyre is subjected, a poor connection has been observed between the transponder and the antenna coil.

In the example shown in FIGS. 3a and 3b, transponder circuit 1 comprises its own antenna coil 10. A coupling coil 2 in the form of a closed loop acts as the inductive coupling interface between the transponder circuit antenna coil and an excitation coil 4 of interrogation circuit 3.

As can be seen in FIGS. 3a and 3b, when transponder circuit 1 is in proximity to excitation coil 4, induced magnetic field 11 of the coupling coil and primary field 8, which is opposite to induced magnetic field 11, passes through its antenna coil 10. Consequently, since the direction of the primary magnetic field is opposite to the direction of the induced magnetic field in closed loop coupling coil 2, a loss of data or energy can be observed at the moment when transponder circuit 1 is opposite excitation coil 4 of the interrogation circuit.

When transponder circuit 1 is far from excitation coil 4, only induced magnetic field 11 in coupling coil 2 transmits energy and data thereto. Despite the presence of the coupling coil, the transmission of energy or data is dependent upon the rotation of vehicle wheel 5 and thus upon the position of the transponder circuit on said wheel, which is a major drawback. This problem can also be observed when the transponder circuit communicates with the interrogation circuit.

In this regard, EP Patent No. 1 354 729 can be cited, which describes the arrangement of a transponder circuit with a magnetic coupling coil as described with reference to FIGS. 3a and 3b. However, the coupling coil and the tyre identification and monitoring transponder circuit are preferably mounted in a tyre tread. However, such an arrangement is also dependent upon the position of the transponder in relation to the excitation coil of an interrogation circuit, which is a drawback.

By way of alternative embodiment shown in FIGS. 4a and 4b, the magnetic coupling coil 2 can comprise a loop portion 2' surrounding antenna coil 10 of transponder circuit 1. This has the effect of increasing the intensity of induced field 11 penetrating antenna coil 10 without modifying the dependence of the position of transponder 1 as indicated hereinbefore. When transponder circuit 1 is in proximity to excitation coil 4 of interrogation circuit 3, the resulting field penetrating the antenna coil is the sum of the primary magnetic field and the opposite sign induced field of the coupling coil, which is a drawback for data and electrical energy transmission.

SUMMARY OF THE INVENTION

It is thus an object of the invention to overcome the drawbacks of the aforementioned prior art by providing an arrangement of a magnetic coupling coil and a transponder circuit on a vehicle wheel for communicating with an interrogation circuit mounted on the fixed structure of the vehicle so as to be independent of the position of the transponder circuit on the wheel in relation to the interrogation circuit.

The invention therefore concerns an arrangement of a magnetic coupling coil and a transponder circuit on a vehicle wheel, which is characterized in that the magnetic coupling coil comprises a loop portion oriented such that the magnetic field in the magnetic coupling coil, which is induced by a primary magnetic field produced by the interrogation circuit excitation coil, is directed in this loop portion in a substantially perpendicular direction to the primary magnetic field, and in that the transponder circuit antenna coil, which is arranged on the coupling coil loop portion, is oriented so that only the induced magnetic field of the coupling coil loop portion passes therethrough without being influenced by the primary magnetic field.

One advantage of this arrangement lies in the fact that even if the transponder circuit antenna coil is in proximity to the interrogation circuit excitation coil, the induced field in the coupling coil loop portion is in a substantially perpendicular direction to the primary field. Consequently, the antenna coil only picks up the induced magnetic field in the coupling coil without being influenced by the primary magnetic field.

Preferably, the loop portion describes a winding formed of several turns wherein the axis of the turns corresponds or is parallel to the axis of the turns of the transponder circuit antenna coil. The antenna coil can be located inside the winding of the coupling coil loop portion.

The transponder circuit can comprise one or several sensors for measuring a physical parameter. It may be a pressure sensor for measuring the pressure of the vehicle tyres, a temperature sensor, a force sensor, an accelerometer or any other type of sensor. The measurements carried out by the sensor or sensors of the transponder circuit can be transmitted to the interrogation circuit by inductive coupling in the inductive signals for example by amplitude modulation.

The closed loop coupling coil, of larger dimensions than the transponder circuit antenna coil, can comprise a wire describing at least two turns. This coupling coil can thus be arranged on or in two inner lateral walls of the vehicle wheel tyre for picking up the primary magnetic field regardless of the orientation of the tyre mounted on the wheel rim.

BRIEF DESCRIPTION OF THE DRAWINGS

The objects, advantages and features of the arrangement of a magnetic coupling coil and a transponder circuit on a vehicle wheel will appear more clearly in the following description of at least one embodiment illustrated by the annexed drawings, in which:

FIGS. 5a and 5b show in a simplified manner partial front and side views of an embodiment of an arrangement of a magnetic coupling coil and a transponder circuit on a vehicle wheel, according to the invention, in communication with an interrogation circuit mounted on a fixed structure of the vehicle.

DESCRIPTION OF PREFERRED EMBODIMENTS

Figures 1A, 1B:
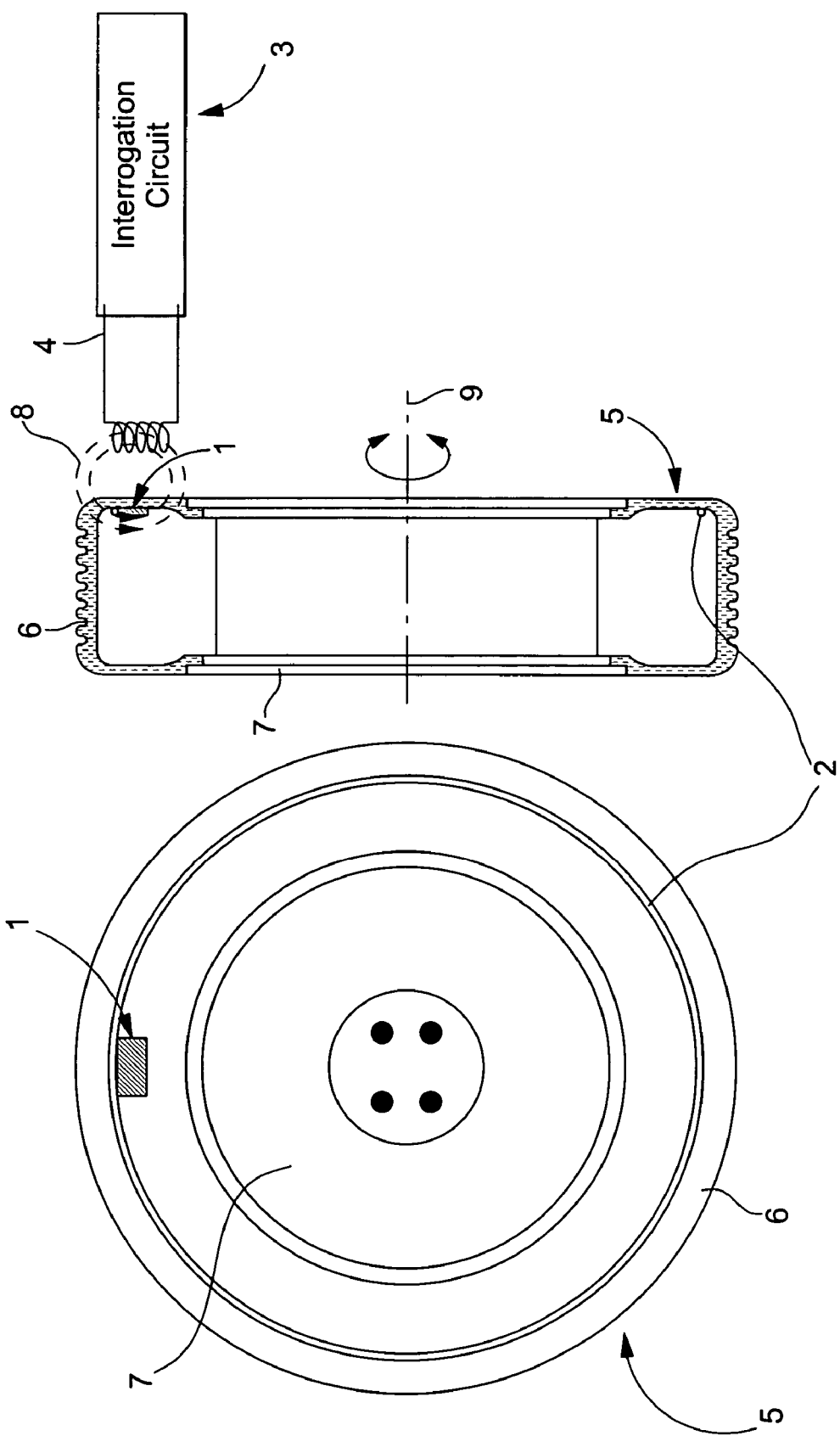
FIGS. 1a and 1b, already cited, show in a simplified manner front and side views partially in cross-section of a conventional arrangement of a coupling coil and a transponder circuit on a wheel in communication with an interrogation circuit mounted on a fixed structure of the vehicle, FIGS. 2a and 2b, already cited, show in a simplified manner partial front and side views of a coupling coil directly connected to a transponder circuit mounted on a vehicle wheel in communication with an interrogation circuit mounted on a fixed vehicle structure, according to the prior art, FIGS. 3a and 3b, already cited, show in a simplified manner partial front and side views of a closed loop coupling coil and a transponder circuit with an antenna coil mounted on a wheel in communication with an interrogation circuit mounted on a fixed structure of the vehicle, according to the prior art, FIGS. 4a and 4b, already cited, show in a simplified manner partial front and side views of a variant of the coupling coil of FIGS. 3a and 3b with the transponder circuit in communication with an interrogation circuit mounted on a fixed structure of the vehicle, according to the prior art.

A preferred embodiment of the arrangement of a magnetic coupling coil and a transponder circuit on a vehicle wheel, to enable communication with an interrogation circuit on a fixed structure of the vehicle, will now be described. It should be noted that in the following description, all of the electronic components of the transponder circuit or of the interrogation circuit, which are well known to those skilled in this technical field, will not be explained in detail.

As previously described with reference to FIGS. 1a and 1b, the subject of the invention is a particular arrangement of a magnetic coupling coil 2 and a transponder circuit 1 mounted on a vehicle wheel 5 for wireless communication with an interrogation circuit 3 mounted on the fixed structure of the vehicle. Wireless data communication between an excitation coil 4 of interrogation circuit 3 and an antenna coil of transponder circuit 1, not shown in FIGS. 1a and 1b, can be accomplished owing to coupling coil 2, which acts as an inductive coupling interface. In order to do this, a primary magnetic field 8 is for example transmitted by the excitation coil in order to pass through coupling coil 2. An induced magnetic field in this coupling coil, of the opposite direction to primary magnetic field 8, then has to be sensed by the transponder circuit antenna coil without being influenced by primary magnetic field 8 whatever the position of the transponder circuit on the wheel, as explained hereinafter with reference to FIGS. 5a and 5b.

Magnetic coupling coil 2, which is preferably of circular shape, is mounted coaxially to rotational axis 9, which passes through the centre of rim 7 of vehicle wheel 5. This coupling coil 2 can comprise one or several turns forming a closed loop, the general plane of which is substantially perpendicular to rotational axis 9 of the wheel. This coupling coil can be integrated in the structure of vehicle tyre 6 during manufacture thereof for example, or fixed onto an inner lateral wall or a tyre tread 6 of wheel 5. The metal wire of the coupling coil closed loop can describe sinusoidal shaped ripples on most of its length so as to compensate for changes of length, particularly when the tyre is manufactured. This metal wire can be made of copper, aluminum or even steel.

Of course, in an embodiment that is not shown, if the coupling coil 2 comprises several turns, it can be arranged on or in two inner lateral walls of the vehicle wheel tyre. In this way, the coupling coil can act as the magnetic coupling interface for sensing the primary magnetic field 8 regardless of the orientation of the tyre mounted on the wheel rim, whether the transponder circuit is on one lateral wall of the tyre or the other.

FIGS. 5a and 5b partially show a preferred embodiment of the arrangement of coupling coil 2 and transponder circuit 1 of the wheel according to the invention, in communication with an interrogation circuit 3.

Magnetic coupling coil 2 comprises a coil portion 2" which is configured such that the induced field 11' in this portion is oriented substantially perpendicularly to primary magnetic field 8 generated by excitation coil 4 of interrogation circuit 3. The induced field in the remainder of the coupling coil is also in a perpendicular direction to the induced field in this coil portion 2", but in the opposite direction to primary field 8 passing through the plane of coupling coil loop 2.

Transponder circuit 1 comprises in particular an integrated transponder circuit and an antenna coil 10, which is formed of a multitude of metal wire turns, such as copper. This insulated copper wire can also be arranged on a ferrite core. The transponder circuit elements can be mounted for example on a flexible or rigid printed circuit board.

Antenna coil 10 is preferably introduced into a winding of coupling coil portion 2", which also comprises several turns. This winding can be of equivalent length to the antenna coil.

The axis of the turns of the winding of portion 2" is parallel to the axis of the turns of antenna coil 10. In this manner, only induced field 11' of this coupling coil portion penetrates antenna coil 10 of the transponder circuit. Thus antenna coil 10 is not influenced by the primary magnetic field 8 perpendicular to the induced field 11' of portion 2", whether the transponder circuit is opposite excitation coil 4 of interrogation circuit 3 or in a remote position. Consequently, with this arrangement of coupling coil 2 and antenna coil 10 according to the invention, no waste of data or energy is observed during two-directional communication between the interrogation circuit and the transponder circuit in any position of the transponder circuit on the wheel.

Of course, antenna coil 10 of transponder circuit 1 can also be placed in proximity to and outside of the winding of portion 2" of coupling coil 2 while the axis of the turns of antenna coil 10 is still parallel to the axis of the winding turns.

Passive type transponder circuit 1 can also comprise one or several sensors for measuring physical parameters, such as the tyre pressure, temperature, tyre deformation, rotational speed. In the case of a pressure sensor, one could envisage encapsulating it in a plastic or glass case with an aperture on the pressure measurement membrane. The size of the transponder circuit can be of the order of 5 mm in diameter and 25 mm in length, or even of smaller size. It is fixed onto the inner lateral wall of the tyre preferably inside the winding of portion 2" using hooks or adhesive. For fuller details relating to the transponder circuit and the interrogation circuit and the way of communicating data by inductive signals, reference may be made to EP Patent Application No. 03 004 618.9 in the name of the Applicant.

From the description that has just been given, multiple variants of the arrangement of the magnetic coupling coil and the transponder circuit on the wheel of a vehicle can be conceived by those skilled in the art without departing from the invention defined by the claims. The magnetic coupling coil could have a polygonal shape yet still be positioned coaxially in relation to the rotational axis of the vehicle wheel. Several loop portions oriented for generating an induced field perpendicular to the primary field can be provided on the coupling coil. Thus, a transponder circuit with its own antenna coil can be arranged close to each loop portion. This coupling coil can comprise several turns of a metal wire arranged on an inner lateral wall of the tyre or on two lateral walls, and possibly on the inner wall of the tyre tread. With the exception of the portion which includes a winding of several turns, this coupling coil can be integrated in tyre rubber. Thus the transponder circuit can be fixed inside the tyre after the tyre manufacturing steps.

What is claimed is:

1. An arrangement of a magnetic coupling coil and a transponder circuit on a vehicle wheel for wireless communication with an interrogation circuit arranged on a fixed structure of the vehicle on which the wheel is mounted so as to be able to rotate about at least one rotational axis, the magnetic coupling coil, which is coaxially mounted to the rotational axis of the wheel and defines a closed loop, acting as an inductive coupling interface between an antenna coil of the transponder circuit and an excitation coil of the interrogation circuit, wherein the magnetic coupling coil comprises a loop portion oriented such that the magnetic field in the magnetic coupling coil, which is induced by a primary magnetic field generated by the excitation coil of the interrogation circuit, is directed in this loop portion in a perpendicular direction to the primary magnetic field, and wherein the antenna coil of the transponder circuit, which is arranged in the coupling coil loop or in proximity to and outside of the coupling loop portion, is oriented such that only the induced magnetic field of the coupling coil loop portion passes therethrough without being influenced by the primary magnetic field.

2. The arrangement according to claim 1, wherein the coupling coil portion comprises a winding formed of at least one turn inside which there is arranged the transponder circuit antenna coil, the winding axis parallel to the axis of the turns of the antenna coil being substantially perpendicular to the rotational axis of the wheel.

3. The arrangement according to claim 2, wherein the loop portion winding comprises several turns extending over a distance corresponding to the length of the antenna coil of the transponder circuit in the direction of the axis of the turns.

4. The arrangement according to claim 1, wherein the coupling coil is arranged at the periphery of the wheel on or in an inner lateral wall of the tyre of the vehicle wheel, the excitation coil of the interrogation circuit is arranged on a part of the body or chassis of said vehicle opposite the periphery of the wheel, characterized wherein the transponder of the transponder circuit is of the passive type to be supplied with energy by the primary magnetic field transmitted by the excitation coil of the interrogation circuit.

5. The arrangement according to claim 4, wherein at least the coupling coil loop portion is not integrated in the inner lateral wall of the tyre, and wherein the transponder circuit is held by bonding or using hooks on the inner lateral wall of the tyre, the antenna coil being arranged in a winding of the loop portion.

6. The arrangement according to claim 4, wherein the transponder circuit includes a pressure measurement sensor and/or a temperature measurement sensor encapsulated in a plastic or glass case.

7. The arrangement according to claim 1 , wherein the loop of the magnetic coupling coil, which comprises at least two turns, is arranged on or in two inner lateral walls of the tyre of the vehicle wheel.

8. The arrangement according to claim 2 , wherein the loop of the magnetic coupling coil, which comprises at least two turns, is arranged on or in two inner lateral walls of the tyre of the vehicle wheel.

* * * * *